United States Patent
Varahabhotla et al.

(10) Patent No.: US 11,057,235 B1
(45) Date of Patent: Jul. 6, 2021

(54) CONTROLLING PROTOCOL INDEPENDENT MULTICAST (PIM) JOIN/PRUNE MESSAGES FROM A DOWNSTREAM PIM NEIGHBOR USING A PIM JOIN/PRUNE RESPONSE(S) FROM AN UPSTREAM PIM NEIGHBOR

(71) Applicant: Juniper Networks, Inc., Sunnyvale, CA (US)

(72) Inventors: Venkata Lakshmana Murthy Varahabhotla, Herndon, VA (US); Robert W. Kebler, Newburyport, MA (US); Rahul Unnikrishnan, Herndon, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/790,640

(22) Filed: Feb. 13, 2020

(51) Int. Cl.
  H04L 12/18 (2006.01)
  H04L 1/08 (2006.01)
  H04L 29/08 (2006.01)

(52) U.S. Cl.
  CPC .............. H04L 12/185 (2013.01); H04L 1/08 (2013.01); H04L 69/325 (2013.01)

(58) Field of Classification Search
  CPC ....... H04L 12/185; H04L 45/16; H04L 12/18; H04L 12/1886; H04L 12/4641;
  (Continued)

(56) References Cited

U.S. PATENT DOCUMENTS 9,019,981 B1  4/2015 Weinstein et al.
9,762,403 B2 * 9/2017 Keesara ................. H04L 12/18
(Continued)

OTHER PUBLICATIONS

Extended European Search Report to corresponding European Patent Application No. 20173469.6-1216, dated Oct. 26, 2020 (5 pgs.).
(Continued)

*Primary Examiner* — Chandrahas B Patel
(74) *Attorney, Agent, or Firm* — John C. Pokotylo; Pokotylo Patent Services

(57) ABSTRACT

The potential problem of sending (or resending) PIM join/prune messages (referred to as "PIM join(s)") too infrequently may be solved by: (a) sending a PIM join, including a unique message identifier value, to an upstream PIM peer; (b) responsive to sending the PIM join, (1) starting a quick refresh timer, and (2) starting a standard refresh timer, which is longer than the quick refresh timer; (c) responsive to a determination that the quick refresh timer expired, (1) resending the PIM join to the upstream PIM peer, and (2) restarting the quick refresh timer; (d) responsive to a determination that the standard refresh timer expired, (1) resending the PIM join message to the upstream PIM peer, and (2) restarting the standard refresh timer; (e) receiving a PIM join response from the upstream PIM peer, wherein the PIM join response includes a unique message identifier value; (f) responsive to receiving the PIM join response and determining that the unique message identifier value in the PIM join response matches the unique message identifier value in the PIM join/prune message, stopping the quick refresh timer. The potential problem of sending (or resending) PIM joins too frequently may be solved by having the PIM join response further include a long refresh timer value, and responsive to receiving the PIM join response from the upstream peer, further (1) stopping the standard refresh timer, and (2) starting a long fresh timer using the long refresh timer value, and responsive to determining that the long refresh timer expired, (1) resending the PIM join/prune message to the upstream PIM peer, and (2) restarting the long refresh timer.

19 Claims, 12 Drawing Sheets

(58) Field of Classification Search
CPC ....... H04L 45/12; H04L 45/48; H04L 6/2069; H04L 12/4633
See application file for complete search history.

(56) References Cited

U.S. PATENT DOCUMENTS

| | | | |
|---|---|---|---|
| 9,992,096 B2 * | 6/2018 | Fan | H04L 12/6418 |
| 10,020,952 B1 * | 7/2018 | Cai | H04L 12/1886 |
| 10,218,604 B2 * | 2/2019 | Beeram | H04L 12/1886 |
| 10,439,929 B2 * | 10/2019 | Bhattacharya | H04L 45/28 |
| 10,771,312 B2 * | 9/2020 | Mirsky | H04L 45/745 |
| 2017/0085424 A1 | 3/2017 | Jha et al. | |

OTHER PUBLICATIONS

Kebler et al, "Controlling an aggregate Number of Unique PIM Joins in One or More PIM Join/Prune Messages Received From a PIM Neighbor," Specification, Claims, Abstract and Drawings from co-pending U.S. Appl. No. 16/677,510, filed Nov. 7, 2019.

* cited by examiner

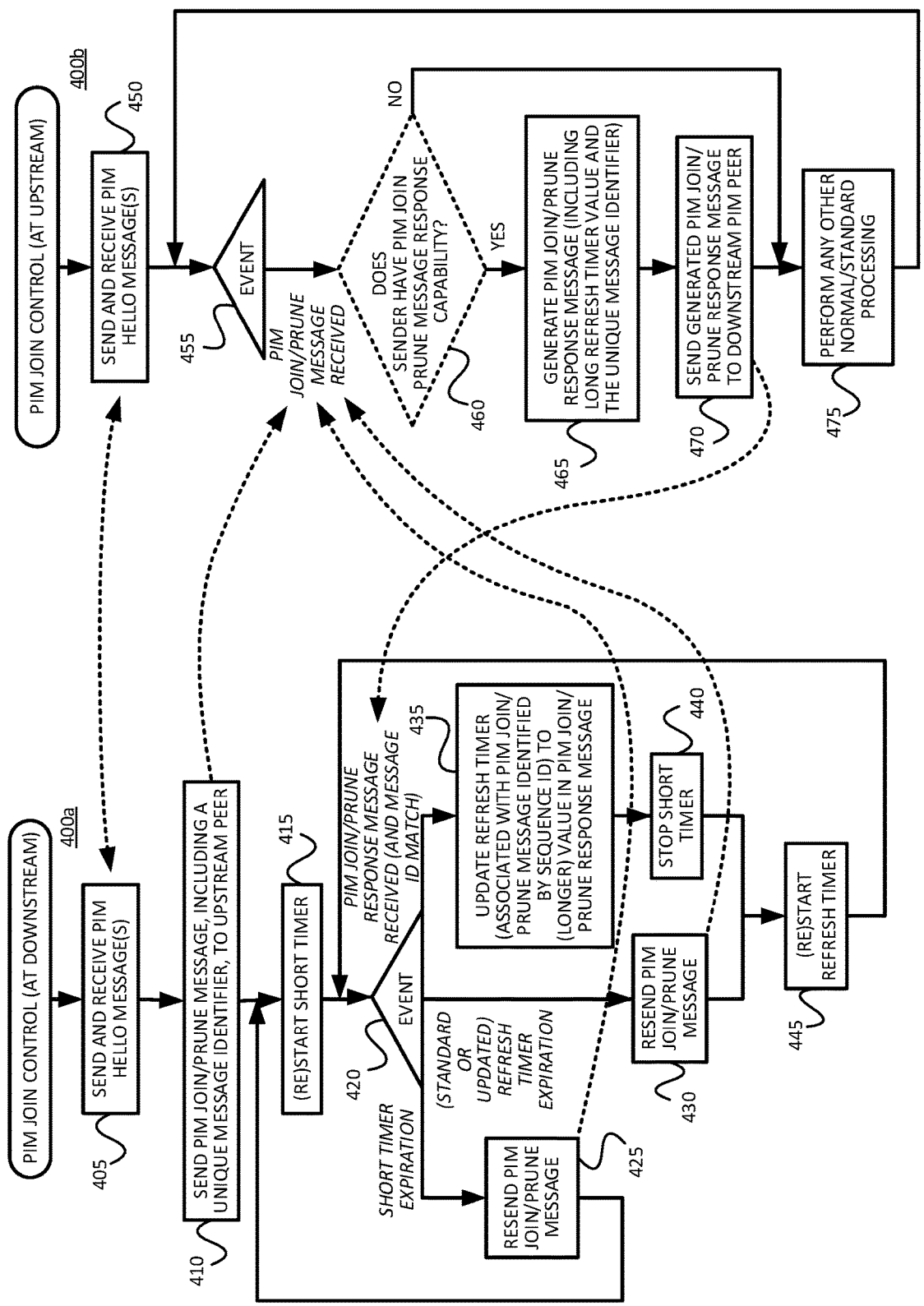

FIGURE 6

| PIM VERSION | TYPE | RESERVED | CHECKSUM |
|---|---|---|---|
| | | DOWNSTREAM NEIGHBOR ADDRESS (ENCODED UNICAST FORMAT) | |
| RESERVED | | NUM GROUPS | HOLD TIME |
| MULTICAST GROUP ADDRESS 1 (ENCODED-GROUP FORMAT) | | | |
| NUMBER OF JOINED SOURCES | | NUMBER OF PRUNED SOURCES | |
| JOINED SOURCE ADDRESS 1 | | | |
| ⋮ | | | |
| JOINED SOURCE ADDRESS n1 | | | |
| PRUNED SOURCE ADDRESS 1 | | | |
| ⋮ | | | |
| PRUNED SOURCE ADDRESS m1 | | | |
| MULTICAST GROUP ADDRESS p (ENCODED-GROUP FORMAT) | | | |
| NUMBER OF JOINED SOURCES | | NUMBER OF PRUNED SOURCES | |
| JOINED SOURCE ADDRESS 1 | | | |
| ⋮ | | | |
| JOINED SOURCE ADDRESS np | | | |
| PRUNED SOURCE ADDRESS 1 | | | |
| ⋮ | | | |
| PRUNED SOURCE ADDRESS mp | | | |

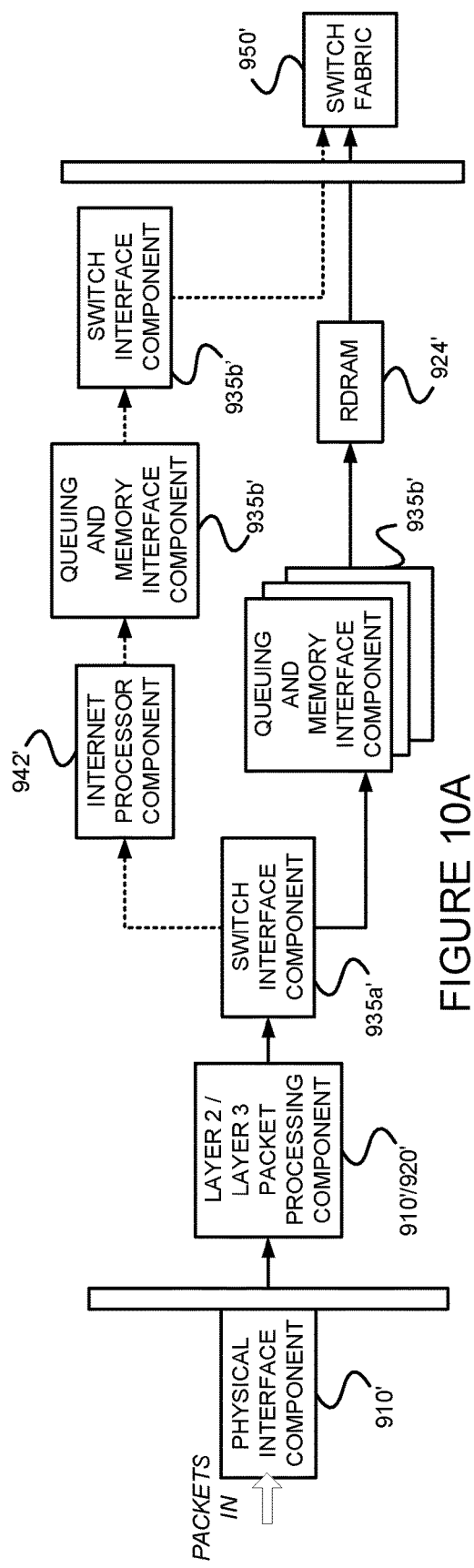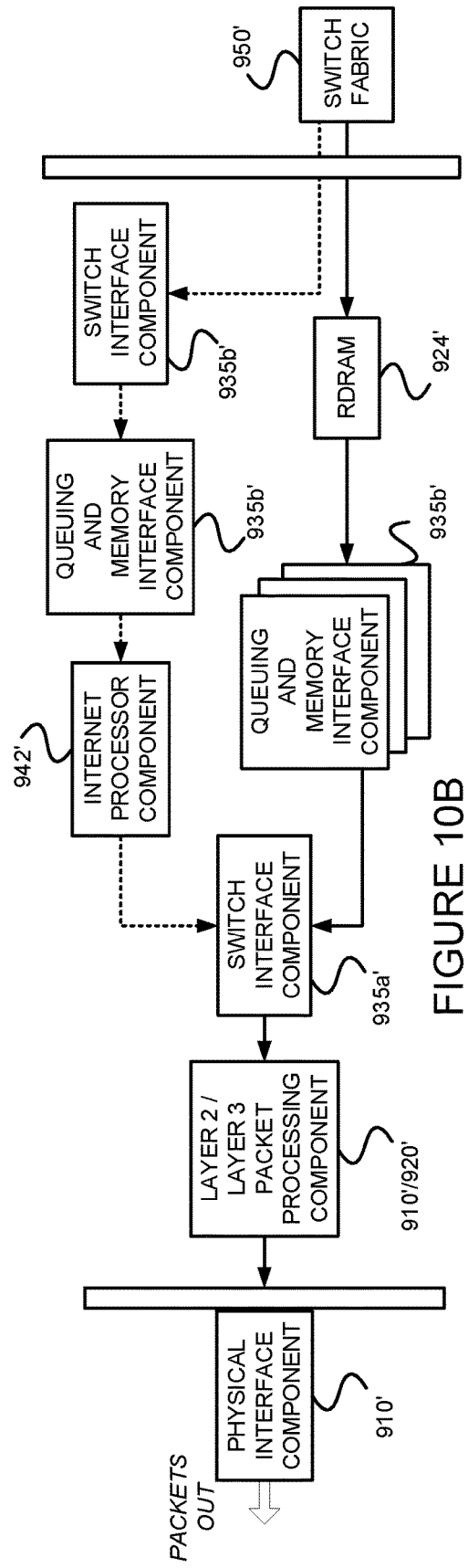

CONTROLLING PROTOCOL INDEPENDENT MULTICAST (PIM) JOIN/PRUNE MESSAGES FROM A DOWNSTREAM PIM NEIGHBOR USING A PIM JOIN/PRUNE RESPONSE(S) FROM AN UPSTREAM PIM NEIGHBOR

1. BACKGROUND OF THE INVENTION

1.1 Field of the Invention

The present description concerns communications networks. More specifically, the present description concerns problems that may arise in a communications network domain employing the protocol independent multicast (PIM) sparse mode (SM) protocol.

1.2 Background Information

1.2.1 PIM-SM

Although the protocol independent multicast (PIM) sparse mode (SM) protocol is well understood by those skilled in the art, it is introduced here for the reader's convenience. The document "Protocol Independent Multicast—Sparse Mode (PIM-SM): Protocol Specification (Revised)," Request for Comments 7761 (Internet Engineering Task Force, March 2016) (referred to as "RFC 7761" and incorporated herein by reference) specifies a multicast routing protocol that can use underlying unicast routing information base or a separate multicast-capable routing information base. It builds unidirectional shared trees rooted at a rendezvous point (RP) per multicast group (G), and optionally creates shorted path trees (SPTs) per multicast source (S).

A PIM-SM domain uses reverse-path forwarding (RPF) to create a path from a data source (S) to the receiver requesting the data. When a receiver issues an explicit join request, an RPF check is triggered. A (*,G) PIM join message (namely, the receiver wants to joint multicast group (G), regardless of the source (*)) is sent toward the RP from the receiver's designated router (DR). (By definition, this message is actually called a join/prune message, but for clarity in this description, may be called either a PIM join message or a PIM prune message, depending on its context.) The join message is multicast, hop by hop, upstream to the ALL-PIM-ROUTERS group (224.0.0.13 for IPv4, or ff02::d for IPv6) by means of each router's RPF interface until it reaches the RP. The RP router receives the (*,G) PIM join message and adds the interface on which it was received to the outgoing interface list (OIL) of the rendezvous-point tree (RPT) forwarding state entry. This builds the RPT connecting the receiver with the RP. The RPT remains in effect, even if no active sources generate traffic.

The (*,G) or (S,G) entries are state information used for forwarding unicast or multicast packets. S is the source IP address, G is the multicast group address, and * represents any source sending to group G. Routers keep track of the multicast forwarding state for the incoming and outgoing interfaces for each source, group (S,G) combination, including any source (*,G).

When a source becomes active, the source DR encapsulates multicast data packets into a PIM register message and sends them by means of unicast to the RP router. If the RP router has interested receivers in the PIM-SM domain, it sends a PIM join message toward the source to build a shortest-path tree (SPT) back to the source. The source sends multicast packets out (e.g., on a local area network (LAN)). The source DR encapsulates the packets in a PIM register message and forwards the message toward the RP router by means of unicast. The RP router receives PIM register messages back from the source, and thus adds a new source to its distribution tree, keeping track of sources in a PIM table. Once an RP router receives packets natively (with S,G), it sends a register stop message to stop receiving the register messages by means of unicast.

In actual application, many receivers with multiple SPTs are involved in a multicast traffic flow. To illustrate the process, consider the multicast traffic from the RP router to one receiver. In such a case, the RP router begins sending multicast packets down the RPT toward the receiver's DR for delivery to the interested receivers. When the receiver's DR receives the first packet from the RPT, the DR sends a PIM join message toward the source DR to start building an SPT back to the source. When the source DR receives the PIM join message from the receiver's DR, it starts sending traffic down all SPTs. When the first multicast packet is received by the receiver's DR, the receiver's DR sends a PIM prune message to the RP router to stop duplicate packets from being sent through the RPT. In turn, the RP router stops sending multicast packets to the receiver's DR, and sends a PIM prune message for this source over the RPT toward the source DR to halt multicast packet delivery to the RP router from that particular source.

If the RP router receives a PIM register message from an active source but has no interested receivers in the PIM sparse-mode domain, it still adds the active source into the PIM table. However, after adding the active source into the PIM table, the RP router sends a register stop message. The RP router discovers the active source's existence and no longer needs to receive advertisement of the source (which utilizes resources).

As should be appreciated from the foregoing, some major characteristics of PIM-SM include the following:

Routers with downstream receivers join a PIM-SM tree through an explicit join message.

PIM-SM RPs are the routers where receivers meet sources.

Sources announce their existence to one or more RPs, and receivers query RPs to find multicast sessions.

Once receivers get content from sources through the RP, the last-hop router (the router closest to the receiver) can optionally remove the RP from the shared distribution tree (*,G) if the new source-based tree (S,G) is shorter. Receivers can then get content directly from the source (rather than via the RP).

The transitional aspect of PIM-SM from a shared tree rooted by the RP, to source-based tree, is one of the major features of PIM, because it prevents overloading the RP or surrounding core links.

The RP router serves as the information exchange point for the other routers. All routers in a PIM-SM domain provide mapping to an RP router. It is the only router that needs to know the active sources for a domain; the other routers just need to know how to reach the RP. In this way, the RP matches receivers with sources. As shown in FIG. 1, the RP router is downstream from the source and forms one end of the shortest-path tree (SPT). As also shown, the RP router is upstream from the receiver and thus forms one end of the RPT.

The benefit of using the RP as the information exchange point is that it reduces the amount of state in non-RP routers. No network flooding is required to provide non-RP routers information about active sources.

RPs can be learned by any one of (A) static configuration, (B) anycast RP, (C) auto-RP, or (D) bootstrap router.

1.2.2 Problems Associated with PIM-SM Join/Prune Messages

FIG. 2 is an example topology 200 used to illustrate potential problems associated with PIM-SM Join/Prune messages. In the example topology 200, each of the hosts 210 can be, for example, a multicast source or a multicast receiver. Assume that at least some of the hosts 210 are multicast receivers sending IGMP report messages. Further, CE1, CE2, . . . , CEn 220 are the first hop routers connecting to provider edge device PE1 230. Both the CEs and PE1 are configured with the address of an RP. As shown in FIG. 2, the RP may be, for example, another PE connected to the core (RPa 240a), connected with another provider edge device (PE2) via another customer edge device (CEm) (RPb 240b), or connected with one of customer edge devices (CEn) that is also connected with PE 1 230 (RPc 240c).

Assume that the CEs are receiving IGMP join/prune message(s) for a specific multicast group. Each of the CEs converts a received IGMP report/leave message(s) to a PIM join/prune message(s) by including group (G) (and source (S), if PIM-Source-Specific Mode (PIM-SSM is) used) information from the IGMP report/leave message(s) in the PIM join/prune message(s), and sends the PIM join/prune message(s) to the PE. There may be a 1-to-1, n-to-1, or 1-to-n relationship between the number of received IGMP report/leave message(s) and the number of generated PIM join/prune message(s). Further, per section 4.9.5 of RFC 7761, a PIM join/prune message may include one or more unique multicast groups (G), each including one or more unique multicast sources (S) (referred to as "a unique (S,G) combination") to be joined and/or pruned. Note that any source is typically denoted with a "*". Thus, a single PIM join/prune message may include zero or more unique "PIM joins" (and zero or more unique "PIM prunes"), each of which is associated with a unique (S,G) combination.

The number of PIM joins that each CE will pack in a single PIM join/prune message and sent to PE1 can be variable. In general, each CE will pack as many as possible of the PIM joins derived from received IGMP report/leave message(s) into a PIM join/prune message.

The present inventors have recognized that, unfortunately, sometimes downstream PIM peers will send triggered PIM join/prune messages inefficiently. For example, when a downstream PIM peer sends a PIM join/prune message, it cannot determine whether or not this message was successfully received by the upstream PIM peer. Consequently, the downstream PIM peer will just keep sending duplicative PIM join/prune messages to its upstream PIM peer whether they are needed or not. So, in many instances, it would be useful if the downstream PIM peer were to send PIM join/prune messages less frequently. If, on the other hand, the upstream PIM peer did not receive a previously sent PIM join/prune message, it might be useful to resend the PIM join/prune message faster than at a default refresh rate (e.g., every 60 seconds).

In view of the foregoing, it would be useful to improve the sending (and resending) of PIM join/prune messages.

2. SUMMARY OF THE INVENTION

The potential problem of sending (or resending) PIM join/prune messages (referred to as "PIM join(s)") too infrequently may be solved by: (a) sending a PIM join, including a unique message identifier value, to an upstream PIM peer; (b) responsive to sending the PIM join, (1) starting a quick refresh timer, and (2) starting a standard refresh timer, which is longer than the quick refresh timer; (c) responsive to a determination that the quick refresh timer expired, (1) resending the PIM join to the upstream PIM peer, and (2) restarting the quick refresh timer; (d) responsive to a determination that the standard refresh timer expired, (1) resending the PIM join message to the upstream PIM peer, and (2) restarting the standard refresh timer; (e) receiving a PIM join response from the upstream PIM peer, wherein the PIM join response includes a unique message identifier value; (f) responsive to receiving the PIM join response and determining that the unique message identifier value in the PIM join response matches the unique message identifier value in the PIM join/prune message, stopping the quick refresh timer.

The potential problem of sending (or resending) PIM joins too frequently may be solved by having the PIM join response further include a long refresh timer value, and responsive to receiving the PIM join response from the upstream peer, further (1) stopping the standard refresh timer, and (2) starting a long fresh timer using the long refresh timer value, and responsive to determining that the long refresh timer expired, (1) resending the PIM join/prune message to the upstream PIM peer, and (2) restarting the long refresh timer.

In at least some of the example methods, the device and the upstream PIM peer have PIM join/prune response capability. At least some example methods may further: send from the device to the upstream PIM peer, first information indicating that the device has PIM join/prune response capability; and receive from the upstream PIM peer, second information indicating that the upstream PIM peer has PIM join/prune response capability. In at least some such example methods, the first information is included in a first PIM Hello message sent from the device to the upstream PIM peer, and the second information is included in a second PIM Hello message sent from the upstream PIM peer to the device.

At least some of the example methods further include: receiving, by the upstream PIM peer, the PIM join/prune message; responsive to receiving the PIM join/prune message by the upstream PIM peer, (1) determining, by the upstream PIM peer, whether or not the device has PIM join/prune response capability, and (2) responsive to determining that the device has PIM join/prune response capability, (A) generating the PIM join/prune response message including the unique message identifier value, and (B) sending the PIM join/prune response message from the upstream PIM peer to the device, and otherwise, responsive to determining that the device does not have PIM join/prune response capability, not generating and second the PIM join/prune response message.

In at least some of the example methods, the unique message identifier is a sequence number. For example, the sequence number may be a 32-bit number.

In at least some of the example methods, the unique message identifier is encoded as a hierarchical PIM join/prune attribute in the upstream neighbor address of the PIM join/prune message.

Any of the foregoing example methods may be implemented on one more PIM device, such as on upstream and/or downstream PIM neighbor devices.

BRIEF DESCRIPTION OF THE DRAWINGS

FIGS. 4A and 4B are flow diagrams of a first example method for controlling the sending of PIM join/prune messages to an upstream peer, in a manner consistent with the present description.

FIG. 6 illustrates an example data structure which may be used to carry a PIM join/prune response message, for example, for carrying a unique message identifier (e.g., a sequence number) and/or long timer information, in a manner consistent with the present description.

FIGS. 10A and 10B illustrate example packet forwarding operations of the example distributed ASICs of FIG. 9.

DETAILED DESCRIPTION

Figure 1:
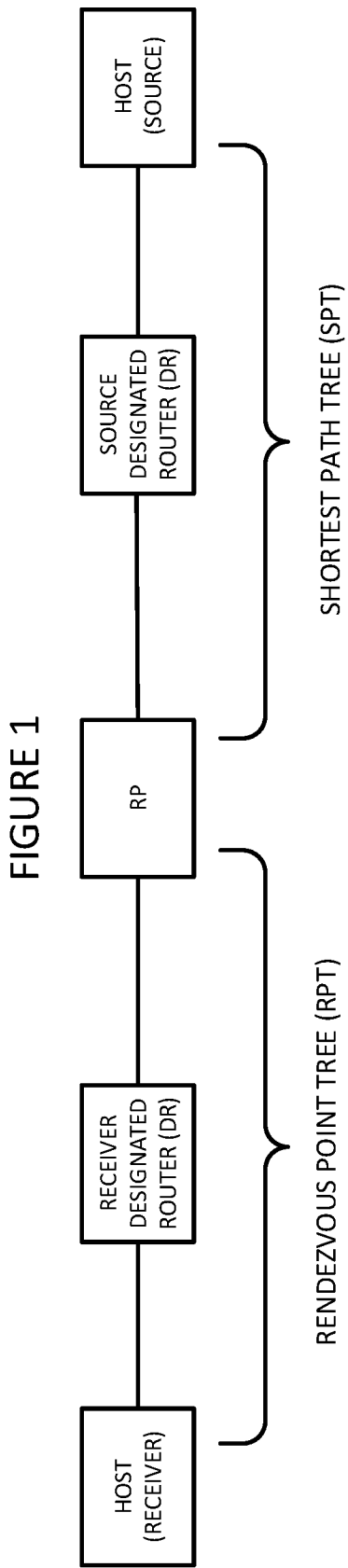
FIG. 1 is a simplified example illustrating components in an example PIM-SM network environment.
Figure 2:
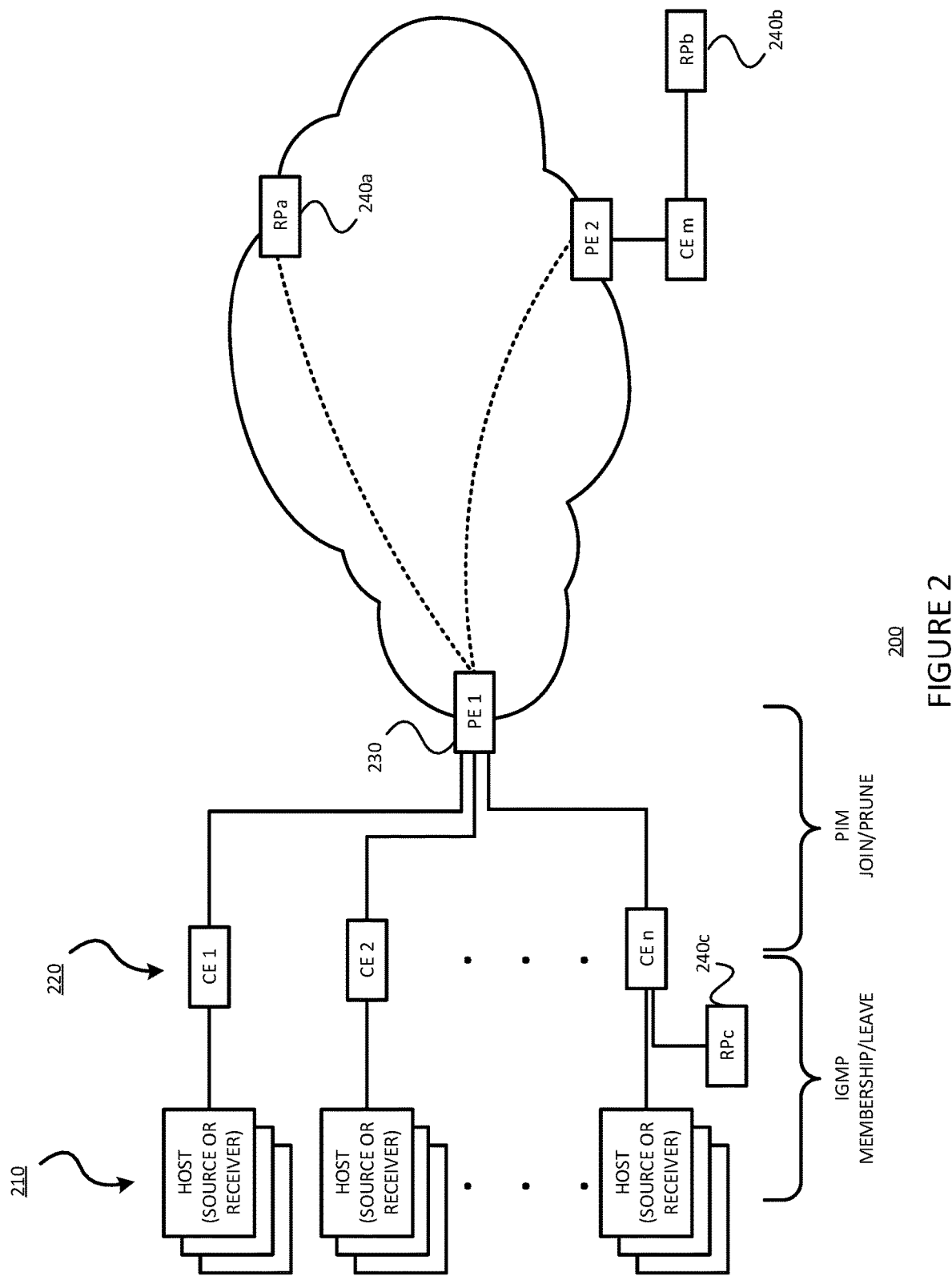
FIG. 2 is an example network used to illustrate a problem addressed by the present description.

The present description may involve novel methods, apparatus, message formats, and/or data structures for controlling the sending of PIM join/prune messages to an upstream peer. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

4.1 Example Methods

The following methods may be used by a downstream PIM peer to send a large number of triggered PIM join/prune messages in an improved manner. For example, the following methods may be used to help adjust a rate at which a large number of triggered PIM join/prune messages are sent and/or received. A PIM join/prune response message, sent from the upstream PIM peer (responsive to processing a received PIM join/prune message) to the downstream PIM peer, is introduced. Instead of having the downstream PIM peer just blast all of its PIM join/prune messages at the upstream PIM peer, it can send some number, wait to receive PIM join/prune response messages, and then send some more. If it doesn't receive a PIM join/prune response message(s) back in a small amount of time (e.g., 5 seconds), it can resend the PIM join/prune message(s) quickly, instead of waiting for a default resend rate (e.g., 60 seconds). This allows a more natural back-off mechanism that will be dynamic and based on current conditions, instead of some static rate.

In addition, one of the following methods can be used to specify a longer refresh rate. For example, assuming that a downstream PIM peer receives a PIM join/prune response message from its upstream PIM peer, it might not need to refresh in the normal rate (e.g., 60 seconds). The upstream PIM peer can even specify a desired refresh period (e.g., 5 minutes, or even much more) in the PIM join/prune response message.

The PIM join/prune response message may have a similar format at the existing PIM join/prune message, but will be sent from the upstream PIM peer to the downstream PIM peer, instead of from the downstream PIM peer to the upstream PIM peer. If the downstream PIM peer includes a unique message identifier (e.g., a single sequence number) for the entire PIM join/prune message (e.g., in the join TLV is associated with the upstream PIM neighbor address in the PIM join/prune message), then the PIM join/prune response message can acknowledge receipt by sending a PIM join/prune response with the same unique identifier (e.g., sequence number). The unique identifier may be included in the join attribute associated with the downstream PIM neighbor address. If there doesn't need to be any groups or sources, the NUM GROUPS field of the messages can be zero.

If, however the downstream PIM peer only wants an acknowledgement for certain groups and/or sources, it can put include the join attribute for only that group(s) and/or source(s). The responding upstream PIM peer will include those source(s) and/or group(s) in the PIM join/prune response message, with the associated unique message identifier (e.g., sequence number) that it is acknowledging.

Figures 3A, 3B:
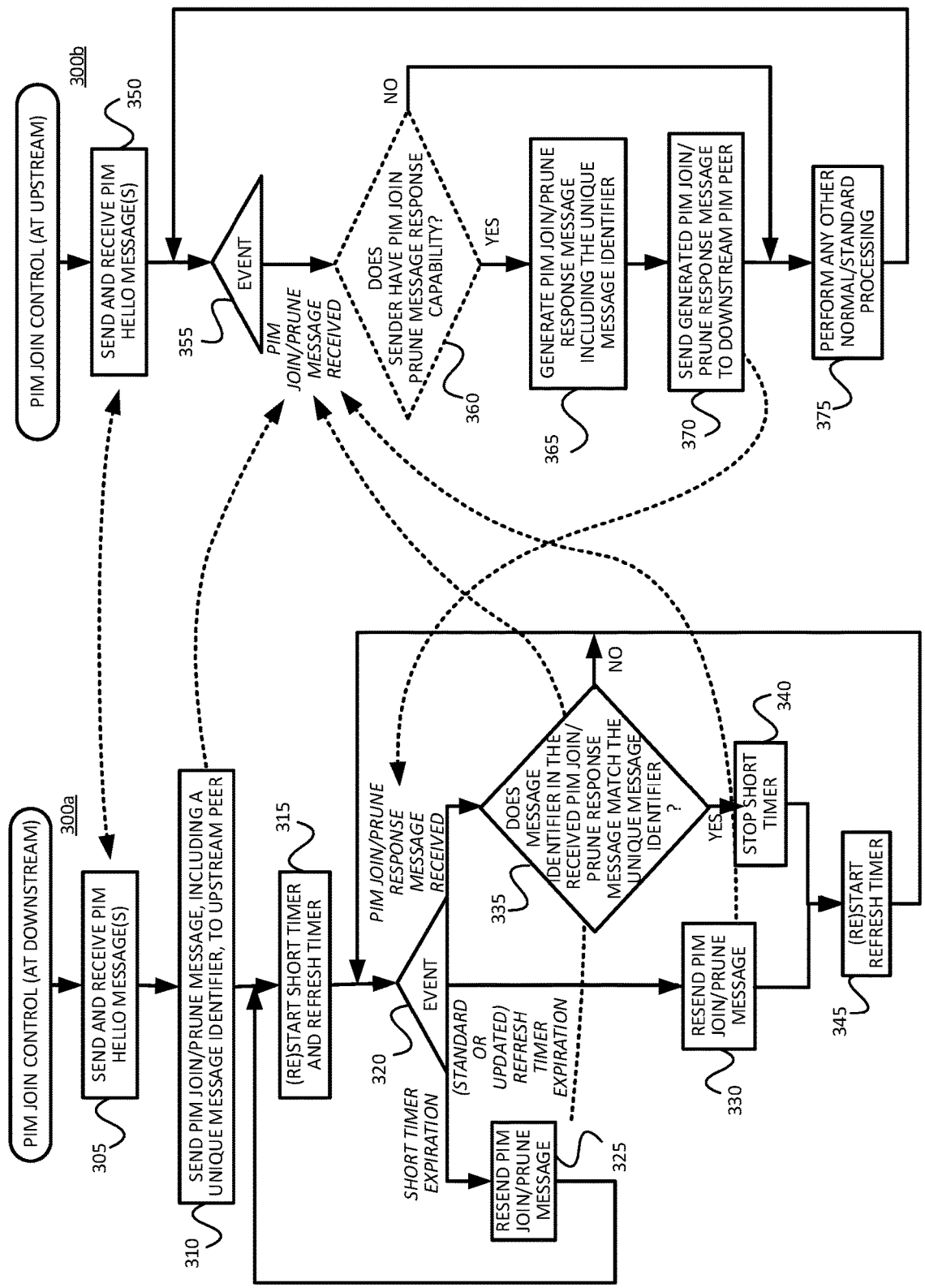
FIGS. 3A and 3B are flow diagrams of a first example method for controlling the sending of PIM join/prune messages to an upstream peer, in a manner consistent with the present description.

FIGS. 3A and 3B are flow diagrams of a first example method for controlling the sending of PIM join/prune messages to an upstream peer, in a manner consistent with the present description. More specifically, FIG. 3A is a flow diagram corresponding to an example method 300a performed by a downstream PIM peer device and FIG. 3B is a flow diagram corresponding to an example method 300b performed by an upstream PIM peer device.

As an initial matter, the method 300a may send (and then receive) a PIM Hello message(s) to (and from) an upstream PIM peer device. (Block 305) The example method 300a may then send a PIM join/prune message, including a unique message identifier, to the upstream peer. (Block 310) In association with (e.g., responsive to) sending the PIM joint/prune message, the example method 300a may start (or restart) a short timer (e.g., 5 seconds) and a refresh timer (e.g., 30 seconds). Different branches of the example method 300a are performed in response to the occurrence of different events. (Event block 320) Referring first to the left-most branch, responsive to the expiration of the short timer, the example method 300a may resend the PIM join/prune message (Block 325), before branching back to block 315. Referring next to the middle branch, responsive to the expiration of a standard (or updated to be longer) refresh timer, the example method 300a may resend the PIM join/prune message (Block 330) and restart the refresh timer (Block 345), before branching back to event 320. Finally, referring to the right-most branch, responsive to the receipt of a PIM join/prune response message (from the upstream PIM peer), the example method 300a determines whether or not the unique message identifier value in the PIM join/prune response message received matches the unique message identifier value in the PIM join/prune message that it had sent earlier. (Decision 335) If so (Decision 335=YES), the example method 300b may stop the short timer (Block 340) and restart the refresh timer (Block 345), before branching back to event 320. Otherwise (Decision 335=NO), the example method 300b may branch back to event 320.

The method 300b may receive (and send) a PIM Hello message(s) from (and to) a downstream PIM peer device. (Block 350) Responsive to receiving a PIM join/prune message (e.g., from its downstream PIM peer) (Event 355), the example method 300b may generate an PIM join/prune response message including the unique message identifier (such as a sequence identifier for example) that was included in the PIM join/prune message received (Block 365), send the generated PIM join/prune response message to the downstream PIM peer (Block 370), and perform any other normal/standard processing (Block 375), before it returns to event 355.

Referring to optional conditional block 360, the example method 300b may determine whether or not the sender of the PIM join/prune message (i.e., the downstream PIM peer) has PIM join/prune response message capabilities. Whether or not the downstream PIM peer has this capability may be indicated by information included in the PIM Hello messages exchanged. (Recall blocks 305 and 350.) If the downstream PIM peer does not have the capability (Decision 360=NO), the example method 300b may branch to block 375, bypassing blocks 365 and 370.

The example method(s) 300a/300b may be run on routers. As one example, the upstream router may be a provider edge router (PE) and the downstream PIM neighbor may be a customer edge router (CE).

FIGS. 4A and 4B are flow diagrams of a second example method for controlling the sending of PIM join/prune messages to an upstream peer, in a manner consistent with the present description. More specifically, FIG. 4A is a flow diagram corresponding to an example method 400a performed by a downstream PIM peer device and FIG. 4B is a flow diagram corresponding to an example method 400b performed by an upstream PIM peer device. The second method of FIGS. 4A and 4B is similar to the first method of FIGS. 3A and 3B, but includes an additional timer (long timer) which may be sent from the upstream PIM peer to lengthen the time between sending (i.e., refreshing) PIM join/prune messages.

As an initial matter, the method 400a may send (and then receive) a PIM Hello message(s) to (and from) an upstream PIM peer device. (Block 405) The example method 400a may then send a PIM join/prune message, including a unique message identifier, to the upstream peer. (Block 410) In association with (e.g., responsive to) sending the PIM joint/prune message, the example method 400a may start (or restart) a short timer (e.g., 5 seconds) and a refresh timer (e.g., 30 seconds). Different branches of the example method 400a are performed in response to the occurrence of different events. (Event block 420) Referring first to the left-most branch, responsive to the expiration of the short timer, the example method 400a may resend the PIM join/prune message (Block 425), before branching back to block 415. Referring next to the middle branch, responsive to the expiration of a standard (or updated to be longer) refresh timer, the example method 400a may resend the PIM join/prune message (Block 430) and restart the refresh timer (Block 445), before branching back to event 420. Finally, referring to the right-most branch, responsive to the receipt of a PIM join/prune response message (from the upstream PIM peer), and assuming that the message identifier in the received PIM join/prune response message matches the unique message identifier that was included in the previously sent PIM join/prune message, the example method 400a may update the refresh timer (associated with the PIM join/prune message identified by the unique message identifier, from the standard value (e.g., 30 seconds) to that of a longer refresh timer value that is included in received the PIM join/prune response message (Block 435), stop the short timer (Block 440) and restart the refresh timer (Block 445), before branching back to event 420. Although not shown, note that if the message identifier in the received PIM join/prune response message did not match the one included in the PIM join/prune message, the example method 400b may branch back to event 420.

The method 400b may receive (and send) a PIM Hello message(s) from (and to) a downstream PIM peer device. (Block 450) Responsive to receiving a PIM join/prune message (e.g., from its downstream PIM peer) (Event 455), the example method 400b may generate an PIM join/prune response message including the unique message identifier (such as a sequence identifier for example) that was included in the PIM join/prune message received (Block 465), send the generated PIM join/prune response message to the downstream PIM peer (Block 470), and perform any other normal/standard processing (Block 475), before it returns to event 455.

Referring to optional conditional block 460, the example method 400b may determine whether or not the sender of the PIM join/prune message (i.e., the downstream PIM peer) has PIM join/prune response message capabilities. Whether or not the downstream PIM peer has this capability may be indicated by information included in the PIM Hello messages exchanged earlier. (Recall, e.g., blocks 405 and 450.) If the downstream PIM peer does not have the capability (Decision 360=NO), the example method 400b may branch to block 475, bypassing blocks 465 and 470.

The example method(s) 400a/400b may be run on routers. As one example, the upstream router may be a provider edge router (PE) and the downstream PIM neighbor may be a customer edge router (CE).

4.1.1 Example Ways to Encode the PIM Join/Prune Control Information

Figure 5:
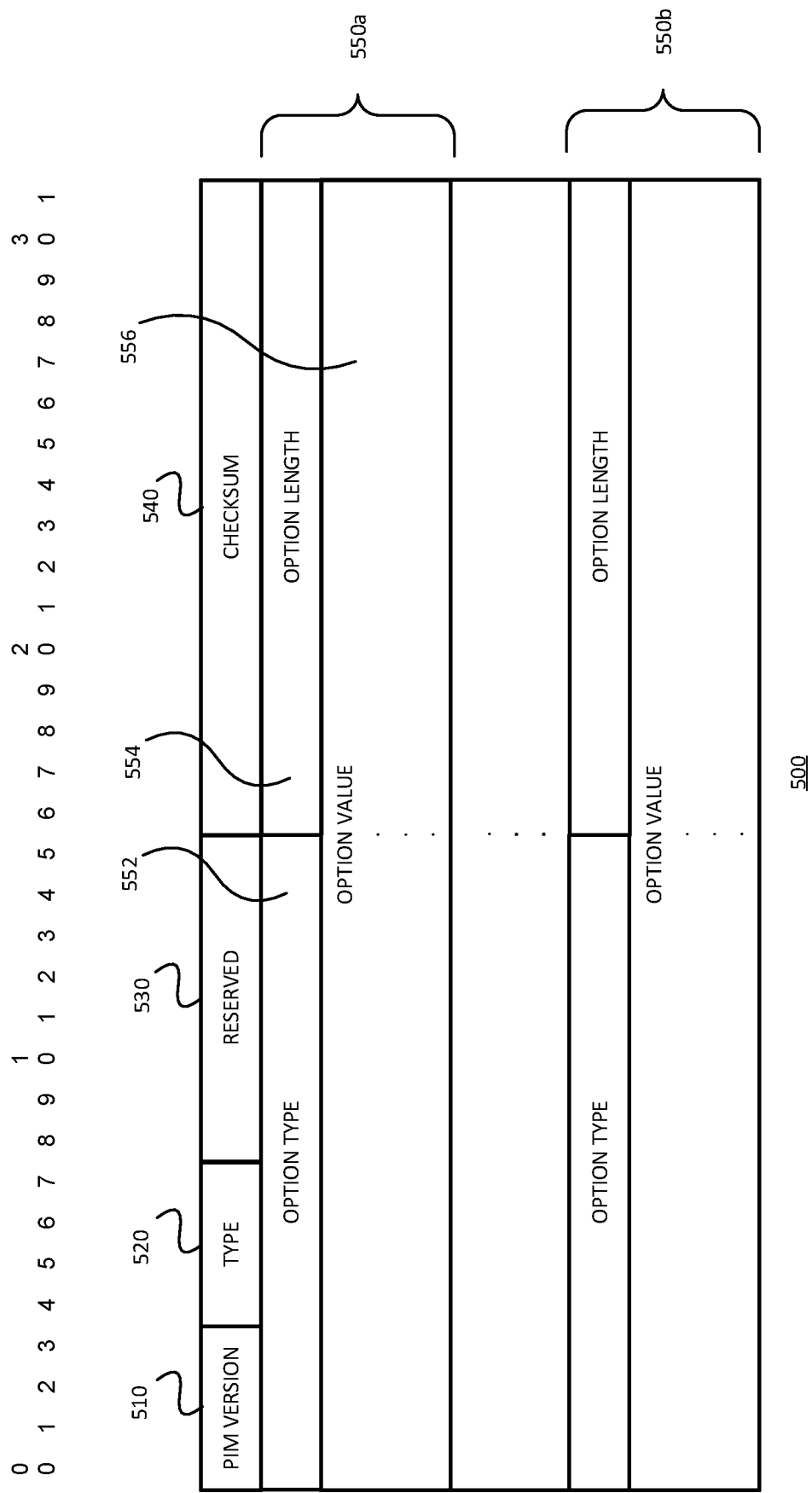
FIG. 5 illustrates an example data structure, such as a PIM Hello message for example, for carrying capability information in a manner consistent with the present description.

FIG. 5 illustrates an example data structure, such as a PIM Hello for example, for carrying capabilities information in a manner consistent with the present description. Per section 4.9.2 of RFC 7761, a PIM Hello message is sent periodically by routers on all interfaces. Per section 4.9 of RFC 7761, the packet format for PIM control messages (including PIM Hello messages) have IP protocol number 103. PIM messages are either unicast (e.g., Registers and Register-Stop) or multicast with TTL 1 to the 'ALL-PIM-ROUTERS' group (e.g., Join/Prune, Asserts). The source address used for unicast messages is a domain-wide reachable address; the source address used for multicast messages is the link-local address of the interface on which the message is being sent. The IPv4 'ALL-PIM-ROUTERS' group is '224.0.0.13'. The IPv6 'ALL-PIM-ROUTERS' group is 'ff02::d'.

The PIM header in the PIM Hello, which is also common to all PIM messages, includes a 4-bit PIM Version field 510, a 4-bit Type field 520, an 8-bit Reserved field 530, and a 16-bit Checksum field 540. The PIM Version number in RFC 7761 is 2. The value in the Type field 520 for a PIM Hello is 0. The bits in the Reserved field 530 are set to zero on transmission and ignored upon receipt. The value in the Checksum field 540 is a standard IP checksum.

The PIM Hello message 500 may include one or more Option Type-Length-Values (TLVs) 550. One of these Option TLVs 550 may carry information indicating whether or not the router has a capability to process PIM prune join response messages (to be set by the Internet Assigned Numbers Authority (IANA)) in option type field 552, a value in the option length field 554 corresponding to the length of the option value, and a value (if needed) in the option value field 556. Of course, this TLV need not be the first Option TLV 550a; it may be any one of a number of Option TLVs 550 carried in the PIM Hello message 500. Note that although the example method 400b indicated that the long refresh timer value is carried in a PIM join/prune response message (an example of which will be described in more detail later), it may be carried as an option TLV in a PIM Hello message.

FIG. 6 illustrates an example data structure 600, referred to as a PIM join/prune response message (which is similar to, but not identical to, a PIM join/prune message (e.g., per 4.9.5 of RFC 7761)), for carrying a unique message identifier and/or a long refresh timer value, in a manner consistent with the present description. More specifically, the example PIM join/prune response message may include a 4-bit PIM Version field 610, a 4-bit Type field 620, an 8-bit Reserved field 630, a 16-bit Checksum field 640, a 32-bit Unicast Downstream (as opposed to "Upstream" in a PIM join/prune message) Neighbor Address field 652, an 8-bit Reserved field 654, an 8-bit Num Groups field 656 and a 16-bit Hold Time field 658. Then, for each of one or more multicast groups 660, a 32-bit multicast group address field, a 16-bit number of joined sources field, a 16-bit number of pruned sources field, and one or more 32-bit fields with joined source addresses and one or more 32-bit fields with pruned source addresses, are provided.

Referring back to field 652, the primary address of the downstream neighbor that is the target of the message. The format for this address may be as specified in the encoded unicast address in Section 4.9.1 of RFC 7761.

Referring back to field 658, in a conventional PIM join/prune message, the Hold Time defines the amount of time a receiver must keep the Join/Prune state alive, in seconds. (Note that this is different from a resend time.) However, this field may be repurposed in a PIM join/prune response to carry the long refresh timer value.

The Number of Groups field 656 may carry the number of multicast group sets contained in the message. The Multicast group address field, the Number of Joined Sources field, the joined source address fields, and the prune source address field may be formatted per section 4.9.1 of RFC 7761. Indeed, this information may be copied from the received PIM join/prune message. Alternatively, since this information would simply be a duplicate of the information in the PIM join/prune message, it may be replaced by a unique message identifier field, such as a unique sequence number for example.

4.2 Example Apparatus

Figure 7:
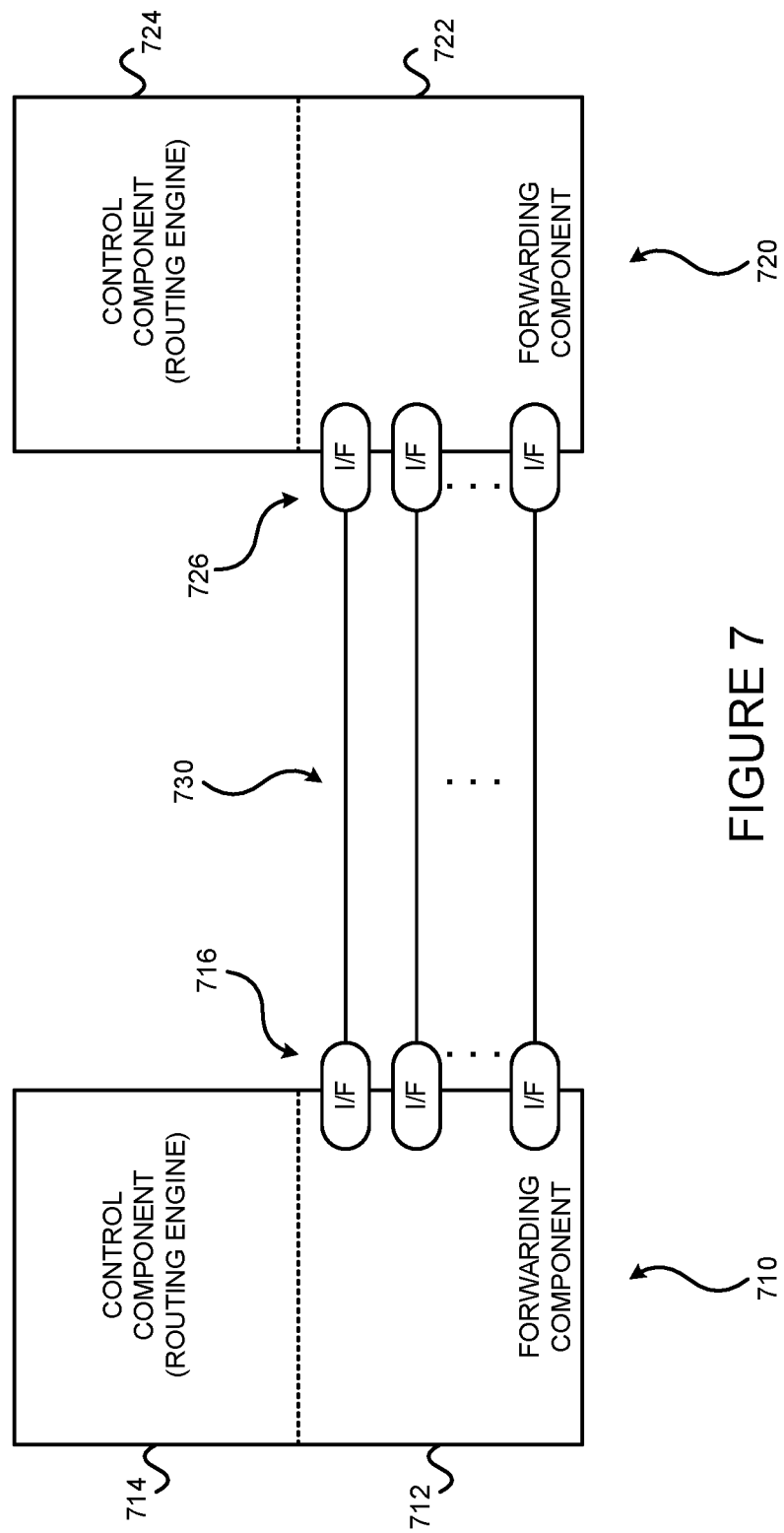
FIG. 7 illustrates an example environment including two systems coupled via communications links.

FIG. 7 illustrates two data forwarding systems 710 and 720 coupled via communications links 730. The links may be physical links or "wireless" links. The data forwarding systems 710,720 may be routers for example. If the data forwarding systems 710,720 are example routers, each may include a control component (e.g., a routing engine) 714,724 and a forwarding component 712,722. Each data forwarding system 710,720 includes one or more interfaces 716,726 that terminate one or more communications links 730. Assuming the device 710 is a customer edge device (CE) and the device 720 is a provider edge device (PE), the example method 300 described above may be implemented in the control component 724 of device 720.

As just discussed above, and referring to FIG. 8, some example routers 800 include a control component (e.g., routing engine) 810 and a packet forwarding component (e.g., a packet forwarding engine) 890.

The control component 810 may include an operating system (OS) kernel 820, routing protocol process(es) 830, label-based forwarding protocol process(es) 840, interface process(es) 850, user interface (e.g., command line interface) process(es) 860, and chassis process(es) 870, and may store routing table(s) 839, label forwarding information 849, and forwarding (e.g., route-based and/or label-based) table(s) 880. As shown, the routing protocol process(es) 830 may support routing protocols such as the routing information protocol ("RIP") 831, the intermediate system-to-intermediate system protocol ("IS-IS") 832, the open shortest path first protocol ("OSPF") 833, the enhanced interior gateway routing protocol ("EIGRP") 834 and the border gateway protocol ("BGP") 835, and the label-based forwarding protocol process(es) 840 may support protocols such as BGP 835, the label distribution protocol ("LDP") 841, the resource reservation protocol ("RSVP") 842, Ethernet virtual private network (EVPN) 843, layer 2 (L2) VPN 844 and segment routing (SR) 845. One or more components (not shown) may permit a user 865 to interact with the user interface process(es) 860. Similarly, one or more components (not shown) may permit an outside device to interact with one or more of the router protocol process(es) 830, the label-based forwarding protocol process(es) 840, the interface process(es) 850, and the chassis process(es) 870, via SNMP 885, and such processes may send information to an outside device via SNMP 885.

The packet forwarding component 890 may include a microkernel 892 over hardware components (e.g., ASICs, switch fabric, optics, etc.) 891, interface process(es) 893, distributed ASICs 894, chassis process(es) 895 and forwarding (e.g., route-based and/or label-based) table(s) 896.

Figure 8:
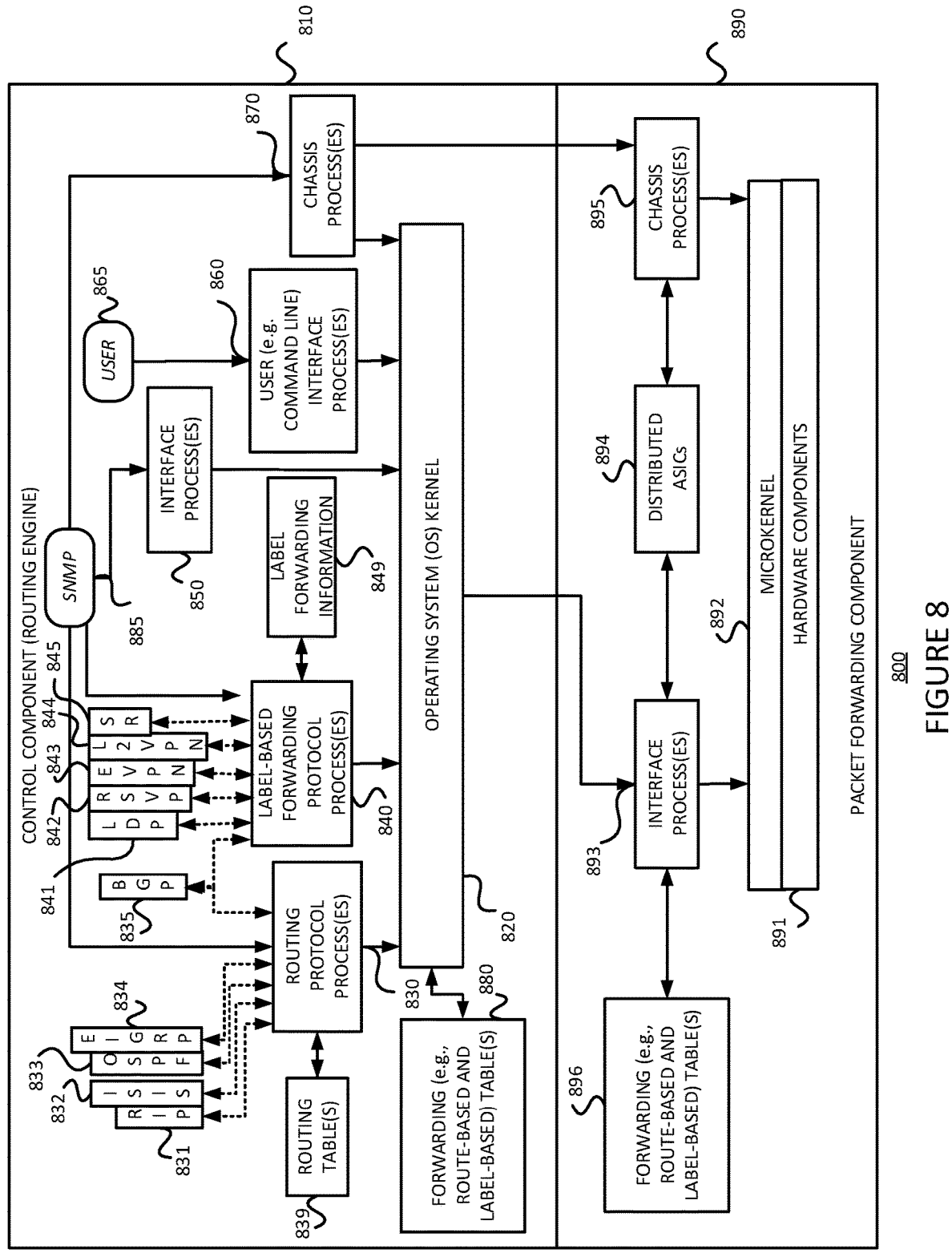
FIG. 8 is a block diagram of an example router on which one or more aspects of the present disclosure may be implemented.

In the example router 800 of FIG. 8, the control component 810 handles tasks such as performing routing protocols, performing label-based forwarding protocols, control packet processing, etc., which frees the packet forwarding component 890 to forward received packets quickly. That is, received control packets (e.g., routing protocol packets and/or label-based forwarding protocol packets) are not fully processed on the packet forwarding component 890 itself, but are passed to the control component 810, thereby reducing the amount of work that the packet forwarding component 890 has to do and freeing it to process packets to be forwarded efficiently. Thus, the control component 810 is primarily responsible for running routing protocols and/or label-based forwarding protocols, maintaining the routing tables and/or label forwarding information, sending forwarding table updates to the packet forwarding component 890, and performing system management. The example control component 810 may handle routing protocol packets, provide a management interface, provide configuration management, perform accounting, and provide alarms. The processes 830, 840, 850, 860 and 870 may be modular, and may interact with the OS kernel 820. That is, nearly all of the processes communicate directly with the OS kernel 820. Using modular software that cleanly separates processes from each other isolates problems of a given process so that such problems do not impact other processes that may be running. Additionally, using modular software facilitates easier scaling.

Still referring to FIG. 8, the example OS kernel 820 may incorporate an application programming interface ("API") system for external program calls and scripting capabilities. The control component 810 may be based on an Intel PCI platform running the OS from flash memory, with an alternate copy stored on the router's hard disk. The OS kernel 820 is layered on the Intel PCI platform and establishes communication between the Intel PCI platform and processes of the control component 810. The OS kernel 820 also ensures that the forwarding tables 896 in use by the packet forwarding component 890 are in sync with those 880 in the control component 810. Thus, in addition to providing the underlying infrastructure to control component 810 software processes, the OS kernel 820 also provides a link between the control component 810 and the packet forwarding component 890.

Referring to the routing protocol process(es) 830 of FIG. 8, this process(es) 830 provides routing and routing control functions within the platform. In this example, the RIP 831, ISIS 832, OSPF 833 and EIGRP 834 (and BGP 835) protocols are provided. Naturally, other routing protocols may be provided in addition, or alternatively. Similarly, the label-based forwarding protocol process(es) 840 provides label forwarding and label control functions. In this example, the LDP 841, RSVP 842, EVPN 843, L2VPN 844 and SR 845 (and BGP 835) protocols are provided. Naturally, other label-based forwarding protocols (e.g., MPLS, etc.) may be provided in addition, or alternatively. In the example router 800, the routing table(s) 839 is produced by the routing protocol process(es) 830, while the label forwarding information 849 is produced by the label-based forwarding protocol process(es) 840.

Still referring to FIG. 8, the interface process(es) 850 performs configuration of the physical interfaces and encapsulation.

The example control component 810 may provide several ways to manage the router. For example, it 810 may provide a user interface process(es) 860 which allows a system operator 865 to interact with the system through configuration, modifications, and monitoring. The SNMP 885 allows SNMP-capable systems to communicate with the router platform. This also allows the platform to provide necessary SNMP information to external agents. For example, the SNMP 885 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 810, thereby avoiding slowing traffic forwarding by the packet forwarding component 890.

Although not shown, the example router 800 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 860 via a console port, an auxiliary port, and/or a management Ethernet port.

The packet forwarding component 890 is responsible for properly outputting received packets as quickly as possible. If there is no entry in the forwarding table for a given destination or a given label and the packet forwarding component 890 cannot perform forwarding by itself, it 890 may send the packets bound for that unknown destination off to the control component 810 for processing. The example packet forwarding component 890 is designed to perform Layer 2 and Layer 3 switching, route lookups, and rapid packet forwarding.

As shown in FIG. 8, the example packet forwarding component 890 has an embedded microkernel 892 over hardware components 891, interface process(es) 893, distributed ASICs 894, and chassis process(es) 895, and stores a forwarding (e.g., route-based and/or label-based) table(s) 896. The microkernel 892 interacts with the interface process(es) 893 and the chassis process(es) 895 to monitor and control these functions. The interface process(es) 892 has direct communication with the OS kernel 820 of the control component 810. This communication includes forwarding exception packets and control packets to the control component 810, receiving packets to be forwarded, receiving forwarding table updates, providing information about the health of the packet forwarding component 890 to the control component 810, and permitting configuration of the interfaces from the user interface (e.g., CLI) process(es) 860 of the control component 810. The stored forwarding table(s) 896 is static until a new one is received from the control component 810. The interface process(es) 893 uses the forwarding table(s) 896 to look up next-hop information. The interface process(es) 893 also has direct communication with the distributed ASICs 894. Finally, the chassis process(es) 895 may communicate directly with the microkernel 892 and with the distributed ASICs 894.

Figure 9:
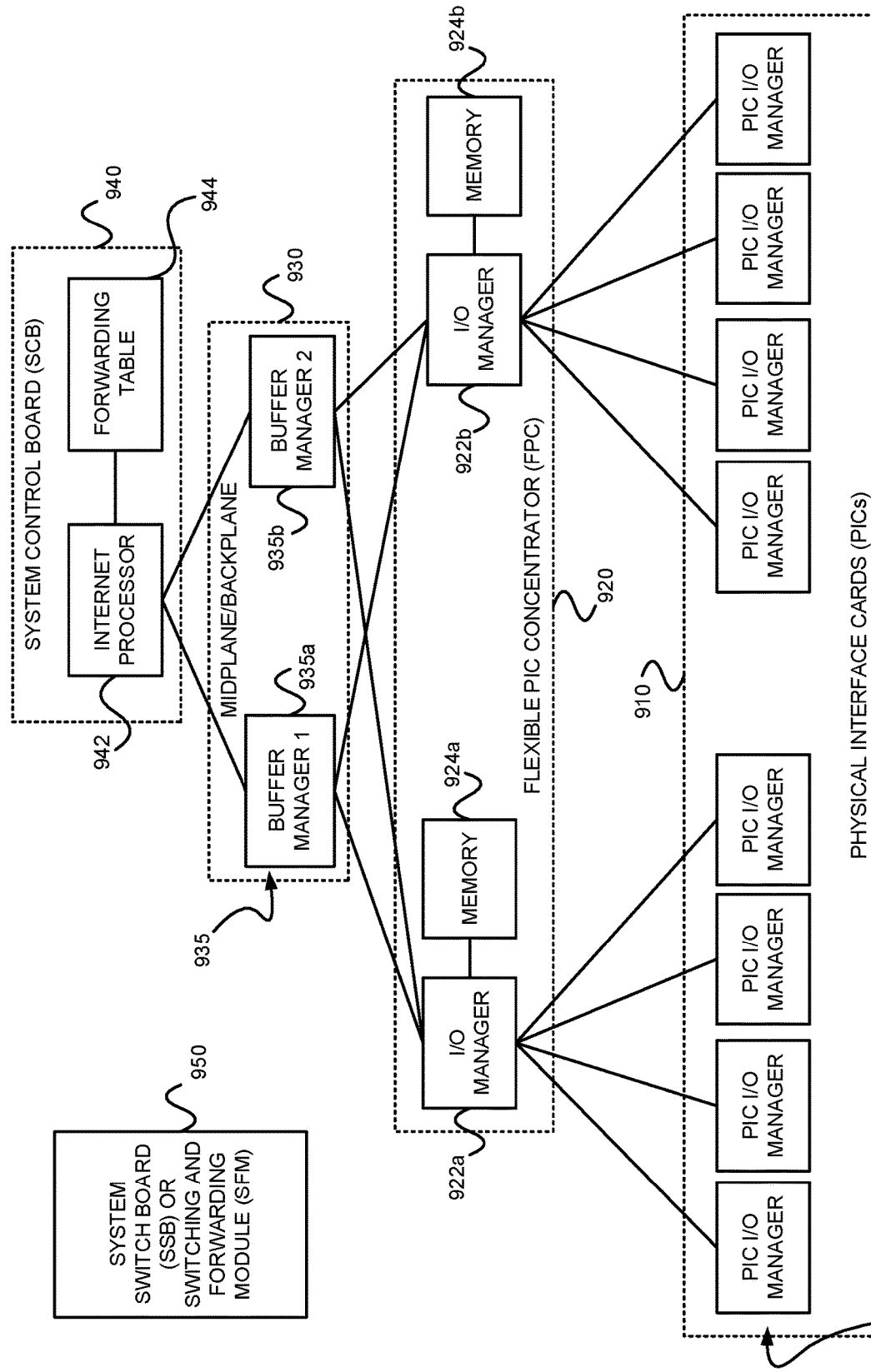
FIG. 9 is a block diagram of example distributed application specific integrated circuits ("ASICs") that may be provided in the example router of FIG. 8.

Referring back to distributed ASICs 894 of FIG. 8, FIG. 9 is an example of how the ASICS may be distributed in the packet forwarding component 890 to divide the responsibility of packet forwarding. As shown in FIG. 9, the ASICs of the packet forwarding component 890 may be distributed on physical interface cards ("PICs") 910, flexible PIC concentrators ("FPCs") 920, a midplane or backplane 930, and a system control board(s) 940 (for switching and/or forwarding). Switching fabric is also shown as a system switch board ("SSB"), or a switching and forwarding module ("SFM") 950. Each of the PICs 910 includes one or more PIC I/O managers 915. Each of the FPCs 920 includes one or more I/O managers 922, each with an associated memory 924. The midplane/backplane 930 includes buffer managers 935a, 935b. Finally, the system control board 940 includes an internet processor 942 and an instance of the forwarding table 944 (Recall, e.g., 896 of FIG. 8).

Still referring to FIG. 9, the PICs 910 contain the interface ports. Each PIC 910 may be plugged into an FPC 920. Each individual PIC 910 may contain an ASIC that handles media-specific functions, such as framing or encapsulation. Some example PICs 910 provide SDH/SONET, ATM, Gigabit Ethernet, Fast Ethernet, and/or DS3/E3 interface ports.

An FPC 920 can contain from one or more PICs 910, and may carry the signals from the PICs 910 to the midplane/backplane 930 as shown in FIG. 9.

The midplane/backplane 930 holds the line cards. The line cards may connect into the midplane/backplane 930 when inserted into the example router's chassis from the front. The control component (e.g., routing engine) 810 may plug into the rear of the midplane/backplane 930 from the rear of the chassis. The midplane/backplane 930 may carry electrical (or optical) signals and power to each line card and to the control component 810.

The system control board 940 may perform forwarding lookup. It 940 may also communicate errors to the routing engine. Further, it 940 may also monitor the condition of the router based on information it receives from sensors. If an abnormal condition is detected, the system control board 940 may immediately notify the control component 810.

Referring to FIGS. 9, 10A and 10B, in some exemplary routers, each of the PICs 910,810' contains at least one I/O manager ASIC 915 responsible for media-specific tasks, such as encapsulation. The packets pass through these I/O ASICs on their way into and out of the router. The I/O manager ASIC 915 on the PIC 910,810' is responsible for managing the connection to the I/O manager ASIC 922 on the FPC 920,820', managing link-layer framing and creating the bit stream, performing cyclical redundancy checks (CRCs), and detecting link-layer errors and generating alarms, when appropriate. The FPC 920 includes another I/O manager ASIC 922. This ASIC 922 takes the packets from the PICs 910 and breaks them into (e.g., 74-byte) memory blocks. This FPC I/O manager ASIC 922 sends the blocks to a first distributed buffer manager (DBM) 935a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 935a' manages and writes packets to the shared memory 924 across all FPCs 920. In parallel, the first DBM ASIC 935a' also extracts information on the destination of the packet and passes this forwarding-related information to the Internet processor 942/842'. The Internet processor 942/842' performs the route lookup using the forwarding table 944 and sends the information over to a second DBM ASIC 935b'. The Internet processor ASIC 942/842' also collects exception packets (i.e., those without a forwarding table entry) and sends them to the control component 810. The second DBM ASIC 935b' then takes this information and the 74-byte blocks and forwards them to the I/O manager ASIC 922 of the egress FPC 920/820' (or multiple egress FPCs, in the case of multicast) for reassembly. (Thus, the DBM ASICs 935a' and 935b' are responsible for managing the packet memory 924 distributed across all FPCs 920/820', extracting forwarding-related information from packets, and instructing the FPC where to forward packets.)

The I/O manager ASIC 922 on the egress FPC 920/820' may perform some value-added services. In addition to incrementing time to live ("TTL") values and re-encapsulating the packet for handling by the PIC 910, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 922 on the egress FPC 920/820' may be responsible for receiving the blocks from the second DBM ASIC 935b', incrementing TTL values, queuing a pointer to the packet, if necessary, before applying CoS rules, re-encapsulating the blocks, and sending the encapsulated packets to the PIC I/O manager ASIC 915.

Figure 11:
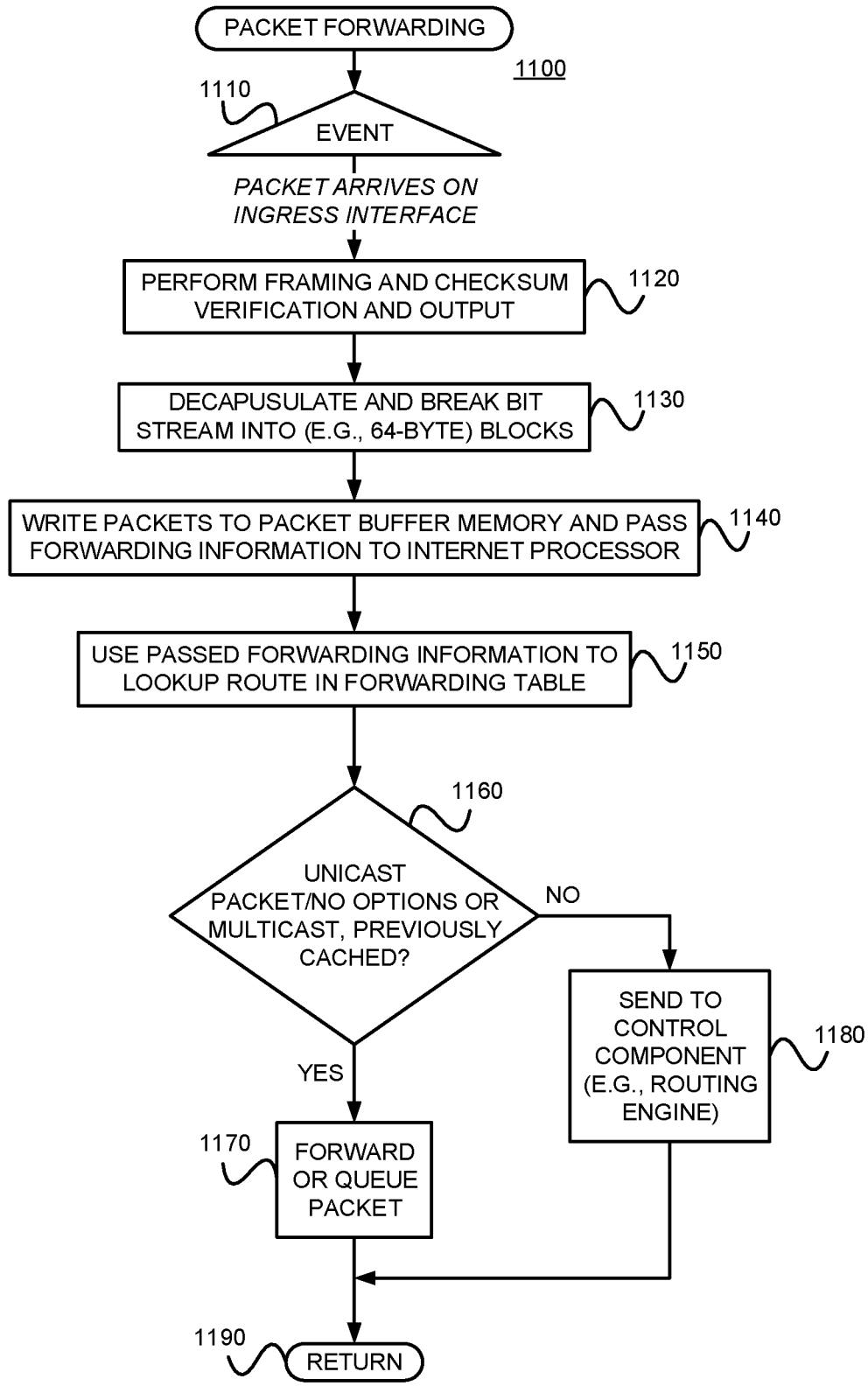
FIG. 11 is a flow diagram of an example packet forwarding method that may be implemented on any of the example routers of FIGS. 8 and 9.

FIG. 11 is a flow diagram of an example method 1100 for providing packet forwarding in the example router. The main acts of the method 1100 are triggered when a packet is received on an ingress (incoming) port or interface. (Event 1110) The types of checksum and frame checks that are required by the type of medium it serves are performed and the packet is output, as a serial bit stream. (Block 1120) The packet is then decapsulated and parsed into (e.g., 64-byte) blocks. (Block 1130) The packets are written to buffer memory and the forwarding information is passed on the Internet processor. (Block 1140) The passed forwarding information is then used to lookup a route in the forwarding table. (Block 1150) Note that the forwarding table can typically handle unicast packets that do not have options (e.g., accounting) set, and multicast packets for which it already has a cached entry. Thus, if it is determined that these conditions are met (YES branch of Decision 1160), the packet forwarding component finds the next hop and egress interface, and the packet is forwarded (or queued for forwarding) to the next hop via the egress interface (Block 1170) before the method 1100 is left (Node 1190) Otherwise, if these conditions are not met (NO branch of Decision 1160), the forwarding information is sent to the control component 810 for advanced forwarding resolution (Block 1180) before the method 1100 is left (Node 1190).

Referring back to block 1170, the packet may be queued. Actually, as stated earlier with reference to FIG. 9, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 922 may send a request for the packet to the second DBM ASIC 935b. The DBM ASIC 935 reads the blocks from shared memory and sends them to the I/O manager ASIC 922 on the FPC 920, which then serializes the bits and sends them to the media-specific ASIC of the egress interface. The I/O manager ASIC 915 on the egress PIC 910 may apply the physical-layer framing, perform the CRC, and send the bit stream out over the link.

Referring back to block 1180 of FIG. 11, as well as FIG. 9, regarding the transfer of control and exception packets, the system control board 940 handles nearly all exception packets. For example, the system control board 940 may pass exception packets to the control component 810.

Although example embodiments consistent with the present disclosure may be implemented on the example routers of FIG. 7 or 8, embodiments consistent with the present disclosure may be implemented on communications network nodes (e.g., routers, switches, etc.) having different architectures. More generally, embodiments consistent with the present disclosure may be implemented on an example system 1000 as illustrated on FIG. 10.

Figure 12:
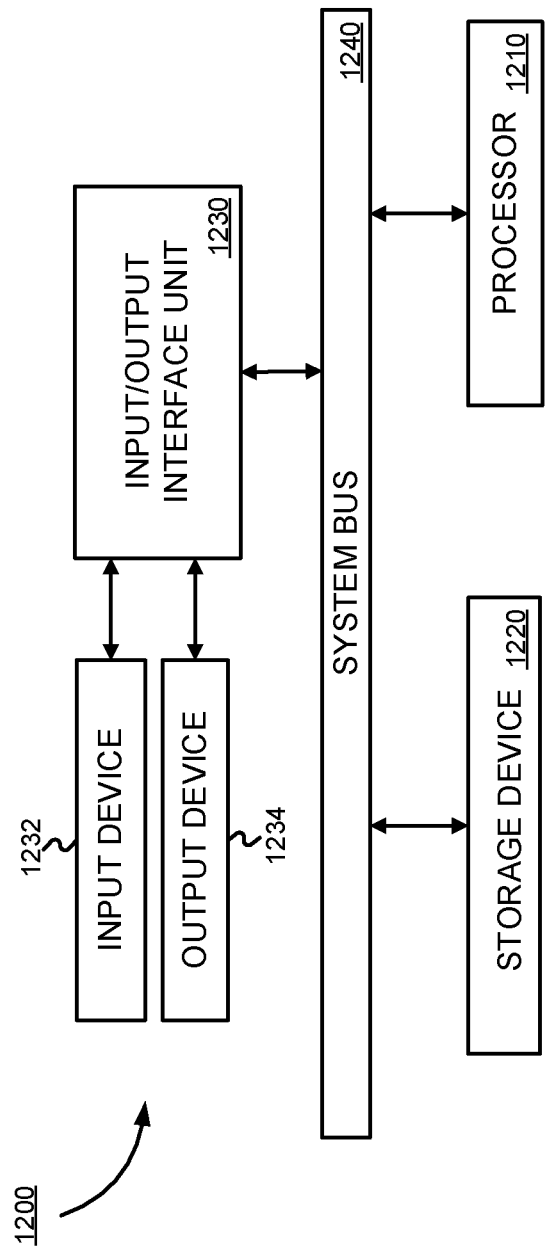
FIG. 12 is a block diagram of an example processor-based system that may be used to execute the example methods described, and/or to store information used and/or generated by such example methods.

FIG. 12 is a block diagram of an exemplary machine 1200 that may perform one or more of the methods described, and/or store information used and/or generated by such methods. The exemplary machine 1200 includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230. The one or more processors 1210 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1220 and/or may be received from an external source via one or more input interface units 1230. The machine executable instructions may be stored as various software modules, each module performing one or more operations. Functional software modules are examples of components of the invention.

In some embodiments consistent with the present disclosure, the processors 1210 may be one or more microprocessors and/or ASICs. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a software defined network (SDN) controller, a laptop computer, desktop computer, a tablet computer, a mobile phone, or any device that has computing and networking capabilities.

4.3 Refinements, Alternatives and Extensions

The Join Attribute in the PIM join/prune message will include a "timeout" value for the information in the PIM join/prune message. This value can be much longer than the existing (default) timeout of 150 seconds, since the downstream PIM peer will know whether or not its upstream PIM peer received the sent PIM join/prune message based on whether or not it received a corresponding PIM join/prune response message. Therefore, this timeout could be greatly increased (e.g., to 5 minutes, or even 30 minutes) to help reduce the load of periodic Joins.

Since most of the CPU resources used to run PIM is consumed handling periodic PIM join/prune message refreshes, this can be used to help PIM scale significantly. Also, this allows the PIM protocol to be more extensible and able to accommodate future uses.

The PIM join/prune response message may repurpose fields of the standard PIM join/prune message, and/or may have a new set of TLVs. For example, it may include a longer refresh timer value in the Hold Time field 658, or it may include the longer refresh timer value in a new TLV. As noted above, this capability can be advertised in a Hello Message, to enable the upstream PIM peer to decide whether or not it should send a PIM join/prune response message (e.g., to send it only to those neighbors with the capability). (Recall, e.g., decision blocks 360 and 460 of FIGS. 3B and 4B, respectively.)

For the example methods described to work in a LAN network, "explicit tracking" should be enabled.

The unique message identifier (e.g., sequence number) may be communicated between the downstream and upstream PIM peers in various ways. For example, the document, A. Boers, et al, "The Protocol Independent Multicast (PIM) Join Attribute Format," Request for Comments: 5384 (Internet Engineering Task Force, November 2008) (referred to as "RFC 5384" and incorporated herein by reference) explains adding a join attribute in encoded address format with encoding type 1. (Recall, e.g., TYPE field 620.) The document, S. Venaas et al., "Hierarchical Join/Prune Attributes," Request for Comments 7887 (Internet Engineering Task Force, June 2016)(referred to as "RFC 7887" and incorporated herein by reference) explains hierarchical join attribute, which may be used to extend the use of source address encoding per RFC 5384 to also apply to the Upstream (or Downstream in our modified message) Neighbor Address field and the Group Address field.

As alluded to above, since the unique message identifier (e.g., sequence number) can be included in the PIM join prune response message, this message doesn't necessarily have to mention all (*,G) and/or (S,G) multicast combinations in the response message. Rather, using the unique message identifier, the downstream PIM peer can assume that all the (*,G) and/or (S,G) multicast combinations in the original PIM join/prune message that it sent to the upstream PIM peer to be acknowledged. Alternatively, the upstream PIM peer can selectively acknowledge the receipt of some of the (*,G) and/or (S,G) multicast combinations by including both unique message identifier (e.g., sequence number) and any (*,G) and/or (S,G) groups it wants to acknowledge.

Note that every router has a join timeout. Depending on whether the join is from a source or from a receiver will affect the "upstream" or "downstream" notation used. Consider, for example, PIM-SM peer routers R1 and R2. If R1 sends the join, then R2 sends join response and R2 will have the join timeout, regardless of which of R1 or R2 is upstream and which is downstream.

4.4 Conclusions

As should be appreciated from the foregoing, using example embodiments consistent with the present description, an upstream PIM peer can provide information (e.g., a simple acknowledgement, and/or a longer refresh timer value) to control the sending of PIM join/prune messages from a downstream PIM peer to it.

What is claimed is:

1. A computer-implemented method for use in a system including a device running a protocol independent multicast (PIM) protocol, the computer-implemented method comprising:
   a) sending a PIM join/prune message to an upstream PIM peer, the PIM join/prune message including a unique message identifier value;
   b) responsive to sending the PIM join/prune message,
      1) starting a quick refresh timer, and
      2) starting a standard refresh timer, wherein the standard refresh timer is longer than the quick refresh timer;
   c) determining whether or not the quick fresh timer expired;
   d) responsive to a determination that the quick refresh timer expired,
      1) resending the PIM join/prune message to the upstream PIM peer, and
      2) restarting the quick refresh timer;
   e) determining whether or not the standard refresh timer expired;
   f) responsive to a determination that the standard refresh timer expired,
      1) resending the PIM join/prune message to the upstream PIM peer, and
      2) restarting the standard refresh timer;
   g) receiving a PIM join/prune response message from the upstream PIM peer, wherein the PIM join/prune response message includes a unique message identifier value;
   h) responsive to receiving the PIM join/prune response message, determining whether or not the unique message identifier value in the PIM join/prune response message matches the unique message identifier value in the PIM join/prune message; and
   i) responsive to determining that the unique message identifier value in the PIM join/prune response message does match the unique message identifier value in the PIM join/prune message, stopping the quick refresh timer.

2. The computer-implemented method of claim 1, wherein the device and the upstream PIM peer have PIM join/prune response capability.

3. The computer-implemented method of claim 2, further comprising:
   sending from the device to the upstream PIM peer, first information indicating that the device has PIM join/prune response capability; and
   receiving from the upstream PIM peer, second information indicating that the upstream PIM peer has PIM join/prune response capability.

4. The computer-implemented method of claim 3 wherein the first information is included in a first PIM Hello message sent from the device to the upstream PIM peer, and
   wherein the second information is included in a second PIM Hello message sent from the upstream PIM peer to the device.

5. The computer-implemented method of claim 1, further comprising:
   receiving, by the upstream PIM peer, the PIM join/prune message;
   responsive to receiving the PIM join/prune message by the upstream PIM peer,
      1) determining, by the upstream PIM peer, whether or not the device has PIM join/prune response capability, and
      2) responsive to determining that the device has PIM join/prune response capability,
         A) generating the PIM join/prune response message including the unique message identifier value, and
         B) sending the PIM join/prune response message from the upstream PIM peer to the device, and
      otherwise, responsive to determining that the device does not have PIM join/prune response capability, not generating and second the PIM join/prune response message.

6. The computer-implemented method of claim 1, wherein the unique message identifier is a sequence number.

7. The computer-implemented method of claim 6, wherein the sequence number is a 32-bit number.

8. The computer-implemented method of claim 1, wherein the unique message identifier is encoded as a hierarchical PIM join/prune attribute in the upstream neighbor address of the PIM join/prune message.

9. The computer-implemented method of claim 1, wherein the PIM join/prune response message further includes a long refresh timer value, the computer-implemented method further comprising:
   responsive to receiving the PIM join/prune response message from the upstream peer, further
      stopping the standard refresh timer, and
      starting a long fresh timer using the long refresh timer value;
   determining whether or not the long refresh timer expired; and
   responsive to determining that the long refresh timer expired,
      resending the PIM join/prune message to the upstream PIM peer, and
      restarting the long refresh timer.

10. A system including a device running a protocol independent multicast (PIM) protocol, the device comprising:
    a) at least one communication interface;
    b) at least one processor; and
    c) a storage device storing processor-executable instructions which, when executed by the at least one processor, cause the at least one processor to perform a method including
       1) sending a PIM join/prune message to an upstream PIM peer, the PIM join/prune message including a unique message identifier value,
       2) responsive to sending the PIM join/prune message, starting a quick refresh timer, and
          starting a standard refresh timer, wherein the standard refresh timer is longer than the quick refresh timer,
       3) determining whether or not the quick fresh timer expired,
       4) responsive to a determination that the quick refresh timer expired,
          resending the PIM join/prune message to the upstream PIM peer, and
          restarting the quick refresh timer,
       5) determining whether or not the standard refresh timer expired,
       6) responsive to a determination that the standard refresh timer expired,
          resending the PIM join/prune message to the upstream PIM peer, and
          restarting the standard refresh timer, 7) receiving a PIM join/prune response message from the upstream PIM peer, wherein the PIM join/prune response message includes a unique message identifier value, 8) responsive to receiving the PIM join/prune response message, determining whether or not the unique message identifier value in the PIM join/prune response message matches the unique message identifier value in the PIM join/prune message, and 9) responsive to determining that the unique message identifier value in the PIM join/prune response message does match the unique message identifier value in the PIM join/prune message, stopping the quick refresh timer.

11. The system of claim 10, wherein the method further includes receiving, by the upstream PIM peer, the PIM join/prune message, responsive to receiving the PIM join/prune message by the upstream PIM peer, determining, by the upstream PIM peer, whether or not the device has PIM join/prune response capability, and responsive to determining that the device has PIM join/prune response capability, generating the PIM join/prune response message including the unique message identifier value, and sending the PIM join/prune response message from the upstream PIM peer to the device, and otherwise, responsive to determining that the device does not have PIM join/prune response capability, not generating and second the PIM join/prune response message.

12. The system of claim 10, wherein the unique message identifier is a sequence number.

13. The system of claim 10, wherein the unique message identifier is encoded as a hierarchical PIM join/prune attribute in the upstream neighbor address of the PIM join/prune message.

14. The system of claim 10, wherein the PIM join/prune response message further includes a long refresh timer value, the method further including:

responsive to receiving the PIM join/prune response message from the upstream peer, further stopping the standard refresh timer, and starting a long fresh timer using the long refresh timer value;

determining whether or not the long refresh timer expired; and responsive to determining that the long refresh timer expired, resending the PIM join/prune message to the upstream PIM peer, and restarting the long refresh timer.

15. A computer-readable, non-transitory, storage device storing processor-executable instructions which, when executed by at least one processor, cause the at least one processor to perform a method including:

a) sending a protocol independent multicast (PIM) join/prune message to an upstream PIM peer, the PIM join/prune message including a unique message identifier value;

b) responsive to sending the PIM join/prune message,
1) starting a quick refresh timer, and
2) starting a standard refresh timer, wherein the standard refresh timer is longer than the quick refresh timer;

c) determining whether or not the quick fresh timer expired;

d) responsive to a determination that the quick refresh timer expired,
1) resending the PIM join/prune message to the upstream PIM peer, and
2) restarting the quick refresh timer;

e) determining whether or not the standard refresh timer expired;

f) responsive to a determination that the standard refresh timer expired,
1) resending the PIM join/prune message to the upstream PIM peer, and
2) restarting the standard refresh timer;

g) receiving a PIM join/prune response message from the upstream PIM peer, wherein the PIM join/prune response message includes a unique message identifier value;

h) responsive to receiving the PIM join/prune response message, determining whether or not the unique message identifier value in the PIM join/prune response message matches the unique message identifier value in the PIM join/prune message; and i) responsive to determining that the unique message identifier value in the PIM join/prune response message does match the unique message identifier value in the PIM join/prune message, stopping the quick refresh timer.

16. The computer-readable, non-transitory, storage device of claim 15, wherein the method further includes:

receiving, by the upstream PIM peer, the PIM join/prune message;

responsive to receiving the PIM join/prune message by the upstream PIM peer, 1) determining, by the upstream PIM peer, whether or not the device has PIM join/prune response capability, and 2) responsive to determining that the device has PIM join/prune response capability, A) generating the PIM join/prune response message including the unique message identifier value, and B) sending the PIM join/prune response message from the upstream PIM peer to the device, and otherwise, responsive to determining that the device does not have PIM join/prune response capability, not generating and second the PIM join/prune response message.

17. The computer-readable, non-transitory, storage device of claim 15, wherein the unique message identifier is a sequence number.

18. The computer-readable, non-transitory, storage device of claim 15, wherein the unique message identifier is encoded as a hierarchical PIM join/prune attribute in the upstream neighbor address of the PIM join/prune message.

19. The computer-readable, non-transitory, storage device of claim 15, wherein the PIM join/prune response message further includes a long refresh timer value, the method further including:

responsive to receiving the PIM join/prune response message from the upstream peer, further stopping the standard refresh timer, and starting a long fresh timer using the long refresh timer value;

determining whether or not the long refresh timer expired; and responsive to determining that the long refresh timer expired, resending the PIM join/prune message to the upstream
   PIM peer, and
restarting the long refresh timer.

\* \* \* \* \*

UNITED STATES PATENT AND TRADEMARK OFFICE
CERTIFICATE OF CORRECTION

PATENT NO. : 11,057,235 B1  
APPLICATION NO. : 16/790640  
DATED : July 6, 2021  
INVENTOR(S) : Venkata Lakshmana Murthy Varahabhotla, Robert W. Kebler and Rahul Unnikrishnan Page 1 of 1

It is certified that error appears in the above-identified patent and that said Letters Patent is hereby corrected as shown below:

In the Claims

Column 18, Claim 5, Line 9, should be corrected by replacing:
"not generating and second the PIM join/prune response message"

With:
--not generating and sending the PIM join/prune response message--

Column 19, Claim 11, Line 32, should be corrected by replacing:
"not generating and second the PIM join/prune response message"

With:
--not generating and sending the PIM join/prune response message--

Column 20, Claim 16, Line 46, should be corrected by replacing:
"not generating and second the PIM join/prune response message"

With:
--not generating and sending the PIM join/prune response message--

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*